(12) United States Patent
Bäcklund et al.

(10) Patent No.: US 7,213,751 B2
(45) Date of Patent: May 8, 2007

(54) METHOD AND DEVICE FOR TRANSMISSION OF DATA IN AN ELECTRONIC SHELF LABELING SYSTEM

(75) Inventors: Björn Bäcklund, Uppsala (SE); Fredrik Tjerneld, Uppsala (SE)

(73) Assignee: Pricer AB, Uppsala (SE)

( * ) Notice: Subject to any disclaimer, the term of this patent is extended or adjusted under 35 U.S.C. 154(b) by 60 days.

(21) Appl. No.: 10/415,464

(22) PCT Filed: Oct. 31, 2001

(86) PCT No.: PCT/SE01/02396

§ 371 (c)(1),
(2), (4) Date: Aug. 19, 2003

(87) PCT Pub. No.: WO02/37257

PCT Pub. Date: May 10, 2002

(65) Prior Publication Data

US 2004/0011868 A1    Jan. 22, 2004

(51) Int. Cl.
*G06K 15/00* (2006.01)
(52) U.S. Cl. ..................... 235/383; 235/385
(58) Field of Classification Search ............ 235/383, 235/385, 436, 462.01, 462.46, 472.02, 462.02
See application file for complete search history.

(56) References Cited

U.S. PATENT DOCUMENTS

| | | | | |
|---|---|---|---|---|
| 3,962,634 A | | 6/1976 | Russo | |
| 4,152,760 A | * | 5/1979 | Freitas et al. | 700/9 |
| 5,504,454 A | * | 4/1996 | Daggett et al. | 329/304 |
| 5,504,475 A | | 4/1996 | Houdou et al. | |
| 5,651,010 A | * | 7/1997 | Kostreski et al. | 370/537 |
| 5,880,449 A | * | 3/1999 | Teicher et al. | 235/383 |
| 5,940,006 A | * | 8/1999 | MacLellan et al. | 340/10.1 |
| 6,411,196 B1 | * | 6/2002 | Bhyravabhotla | 340/5.91 |
| 6,736,316 B2 | * | 5/2004 | Neumark | 235/383 |

FOREIGN PATENT DOCUMENTS

| | | |
|---|---|---|
| CA | 2175032 | 4/1996 |
| EP | 0042144 | 11/1981 |
| EP | 0887757 | 4/1998 |
| WO | WO97/20437 | 6/1997 |

* cited by examiner

*Primary Examiner*—Daniel Stcyr
(74) *Attorney, Agent, or Firm*—Jones Day (57) ABSTRACT

A method for creating synchronized transmission of messages in a wireless electronic shelf labeling system comprising at least two transmitters, a plurality of receiving label-units and a central processing unit capable of issuing messages to be transmitted via said transmitters. Wherein a first step involves determining, for each transmitter, the signal delay between issuing of a message at the central processing unit and transmission of the message from the transmitter. Wherein a second step involves actively delaying, in response to said determined signal delay, transmission from the individual transmitters such that synchronized transmission from all transmitters is achieved. The present invention further relates to a wireless electronic shelf labeling system and a transmitter for such a system.

13 Claims, 7 Drawing Sheets

METHOD AND DEVICE FOR TRANSMISSION OF DATA IN AN ELECTRONIC SHELF LABELING SYSTEM

FIELD OF THE INVENTION

The present invention relates to a novel method for creating synchronized transmission of messages in a wireless electronic shelf labeling system and a novel transmitter for such systems.

BACKGROUND OF THE INVENTION

Today, systems, in which the price indicating items of information are stored in a central system computer, are introduced in greater retail stores, which computer, in turn, provides the cash-point locations with price indicating items of information related to various articles. The cashier normally reads, usually by means of an optical reading device, a unique bar code, the so-called EAN code, which is present on each article. Through this code the cash register thereby obtains the current price information of the article in question from the central system computer.

Further a shelf-edge marking is applied at the location of each article, which marking states the name of the article and normally also a cost-per-unit price, e.g. the price per kilogram. Earlier, each article was usually provided also with a sticker stating the price and possibly a temporary discount price. In order to reduce the cost of such a price marking, effort is made, particularly in larger retail stores, to leave out the individual price marking of each article, in which case the price marking is achieved only by means of shelf-edge marking at the storing place of each type of article.

A further step in cost optimization includes electronic shelf-edge markings, which are controlled from the central system computer, thereby stating the price stored in the central system computer of the article in question. Through this, it will be ensured that the items of information of the price marking will correspond to the price charged to the customer at the cash-point, which obtains the price indicating items of information, just like the shelf-edge marking, from the central system computer. Such systems are hereafter referred to as Electronic Shelf Labelling (ESL) systems and one type of such an system has been disclosed, e.g. in the Swedish patent SE 441 447 granted to S. Olsson and R. Ahlm in 1986.

Common to such systems is that the transmission of information should be achieved via wireless in order to obtain a flexible price-marking system. Such transmission is suitably performed by means of radio or light waves. Preferred radio waves are within the short wave range, mainly due to bandwidth regulations. Preferred light waves are within the range of non-visible light, e.g. IR-light as used in prior art for various remote control devices to control electronic or electrical apparatuses, such as TV-sets etc.

Electronic Shelf Labelling (ESL) systems in retail environments using wireless transmission of data from transmitters to electronic labels (EL) commonly comprise a Base Station (BS) to which a number of transceivers are connected, which BS is capable of issuing messages to be transmitted via said transmitters. The BS is in turn connected to and controlled by a central processing unit, and in special embodiments the BS may even be integrated in the central processing unit. Large systems may further comprise several BS, all connected to the central processing unit. With Transciever (TRX) is meant a combined transmitter and receiver device for electromagnetic radiation (like radio, IR etc) or sound waves or other physical means of distributing signals.

Figure 1:
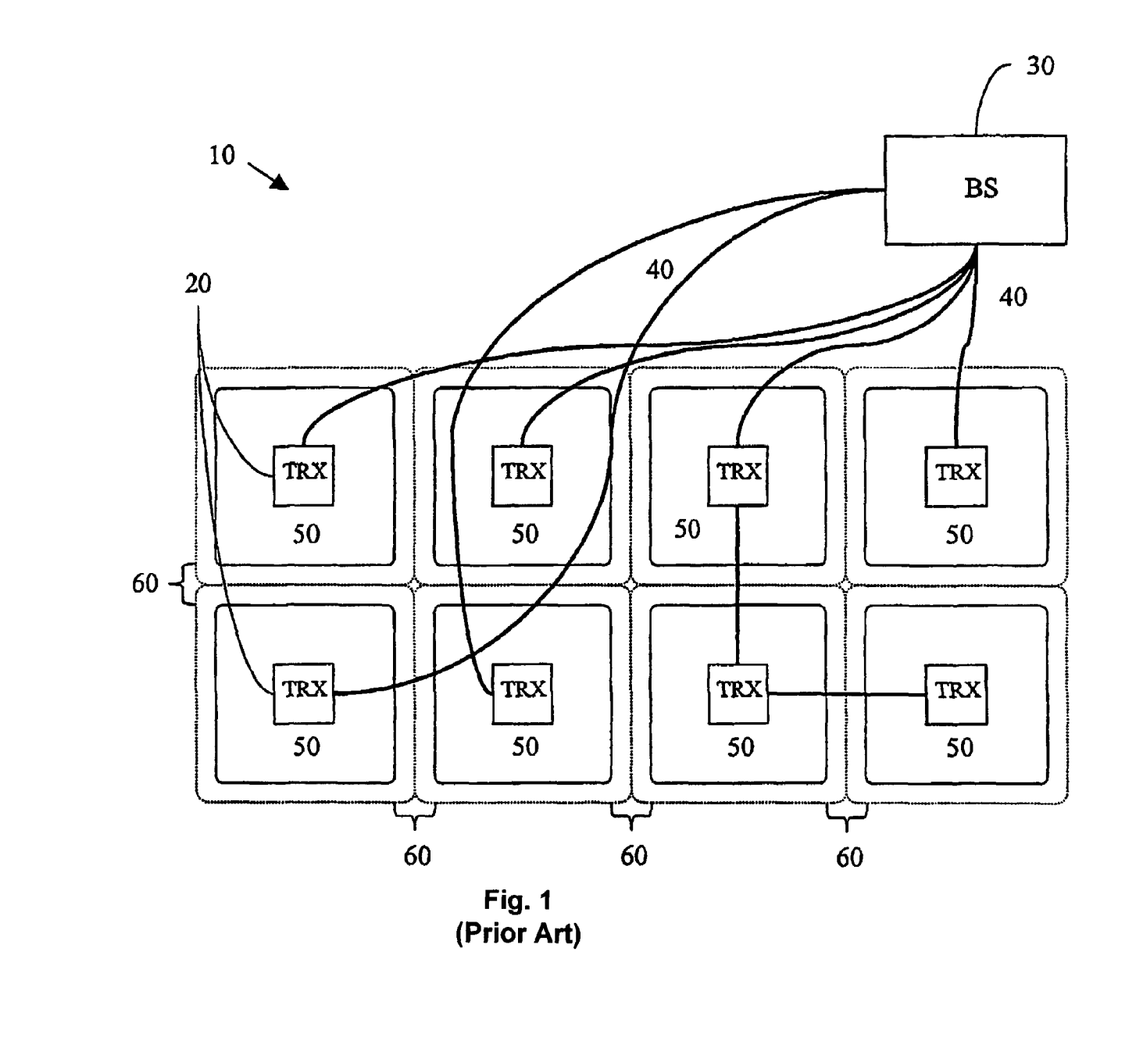
FIG. 1 shows a schematic view of a typical ESL system.
Figure 2A:
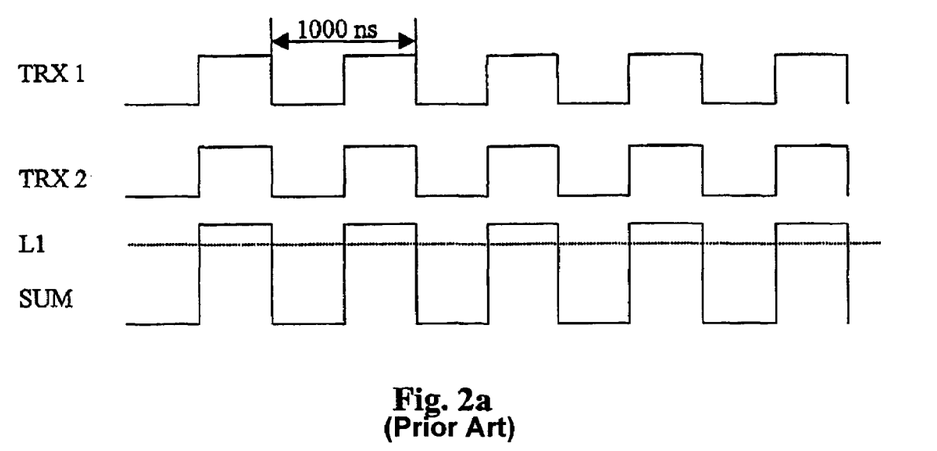
FIGS. 2a and 2b show the principle of constructive and destructive interference of signals from two transmitters respectively.

FIG. 1 shows a schematic view of a typical ESL system 10 wherein eight TRX 20 are connected to a BS 30. The TRX 20 is typically connected to the BS 30 by a signal distribution line 40, such as a twisted pair-cable, a coaxial-cable or the like. The coverage area 50 from a single TRX 20 is shown by the solid line, but to obtain maximum coverage, the TRXes are arranged such that constructive interference of signals is used to obtain the required signal-level in the intermediate regions 60 between the coverage areas 50 of two adjacent TRX 20. FIG. 2a shows the principle of constructive interference of signals from two spaced apart TRX 20. The required signal level is shown by L1.

Figure 2B:
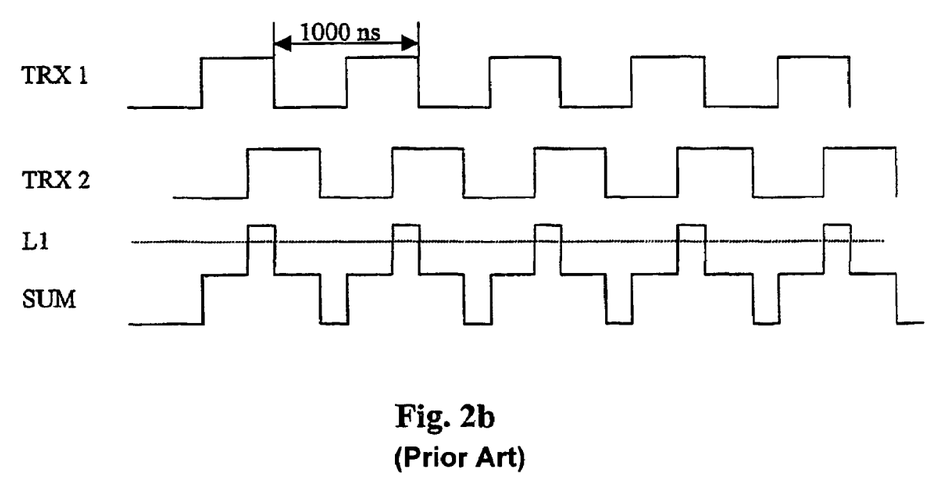

However, as communication frequencies are getting higher, due to a demand for higher transmission capacities and other factors, problems associated with destructive interference or pulse-broadening often arise in the intermediate regions 60. This phenomenon is illustrated in FIG. 2b wherein the part of the resulting pulse that exceeds L1 cannot be detected as a pulse at the receiving end.

SUMMARY OF THE INVENTION

The main reason for destructive interference in such system is non-synchronous transmission from transmitters with adjacent coverage areas. One main contributor to non-synchronous transmission is delay in distribution lines 40 of different lengths.

The object of the invention is to provide a new method for providing synchronized transmission of messages in a wireless electronic shelf labelling system, which overcomes the drawbacks of the prior art. This is achieved by the method for creating synchronized transmission of messages in a wireless electronic shelf labelling system as defined in claim 1, and the transmitter for a wireless electronic shelf labelling system as defined in claim 4.

One advantage with such a method and transmitter is that the problems associated with destructive interference when transmitting data at high bit-rates are avoided.

Another advantage is that the method and transmitter allows use of inexpensive distribution lines for communication between base stations and transceivers in wireless electronic shelf labelling systems.

Embodiments of the invention are defined in the dependent claims.

DETAILED DESCRIPTION OF THE INVENTION

Referring again to FIG. 1, the physical distance between the BS 30 and different TRX 20 differ over a wide range and hence the length of the distribution lines 40 used to connect each TRX 20 with the BS 30 varies over a wide range. As is shown in FIG. 1 the TRX 20 may be connected by a direct line to the BS 30 or in series with one or more other TRX 20.

For example, if the distribution line is represented by a conventional twisted pair cable actual delay times are in the order of 50 ns for a difference in cable length of 10 m. For transmissions with pulse-rates above 1 MHz each pulse has a duration that is less than 500 ns. Hence, a difference in cable length in the order of 50 m between two adjacent TRX will result in a delay of 250 ns in the intermediate region 60, which is not tolerated by many receiving units.

Briefly the present invention provides one solution to this problem by adding an active signal delay unit to each TRX 20 in the system. This active signal delay unit is arranged to delay transmission of signals from the TRX 20 according to an active signal delay parameter that is set to a suitable value for each TRX 20 such that synchronized transmission is achieved. The wording active delay is herein used when referring to an intentionally added delay, which is to be separated from delay that always are present in logical circuits.

One way to find suitable active signal delay parameters is to determine the signal delay between the BS 30 and each TRX 20 connected thereto. Thereafter the active signal delay parameter for each TRX 20 is set to the difference between the delay to that particular TRX 20 and the highest determined distribution signal delay to any TRX 20 in the system. Due to this all transmitters will transmit in a synchronised manner even though the signal delay through the distribution lines may be different. Alternatively, a predefined maximum delay value is used, and the active signal delay parameter for each TRX 20 is set to the difference between the delay to that particular TRX 20 and the maximum delay value.

The determination of the delay may be done in several ways. One preferred way comprises setting the TRX 20 in a mirror-mode so that they automatically mirror all received pulses back to the BS 30 and measuring the time-difference between sending and receiving the same pulse.

More precisely a method for creating synchronized transmission of messages in a wireless electronic shelf labelling system comprise the following steps:
- determining, for each transmitter, the signal delay between issuing of a message at the central processing unit and transmission of the message from the transmitter;
- actively delaying, in response to said determined signal delay, transmission from the individual transmitters such that synchronized transmission from all transmitters is achieved.

As is clear from above the step of actively delaying the transmission is preferably performed at the TRX 20 by an active signal delay unit, but other embodiments may give the same result, such as delaying the transmission for each TRX 20 already in the BS 30. For systems wherein all TRX 20 are connected directly to the BS 30 similar active signal delay units may be arranged at the outputs from the BS 30.

Figure 3:
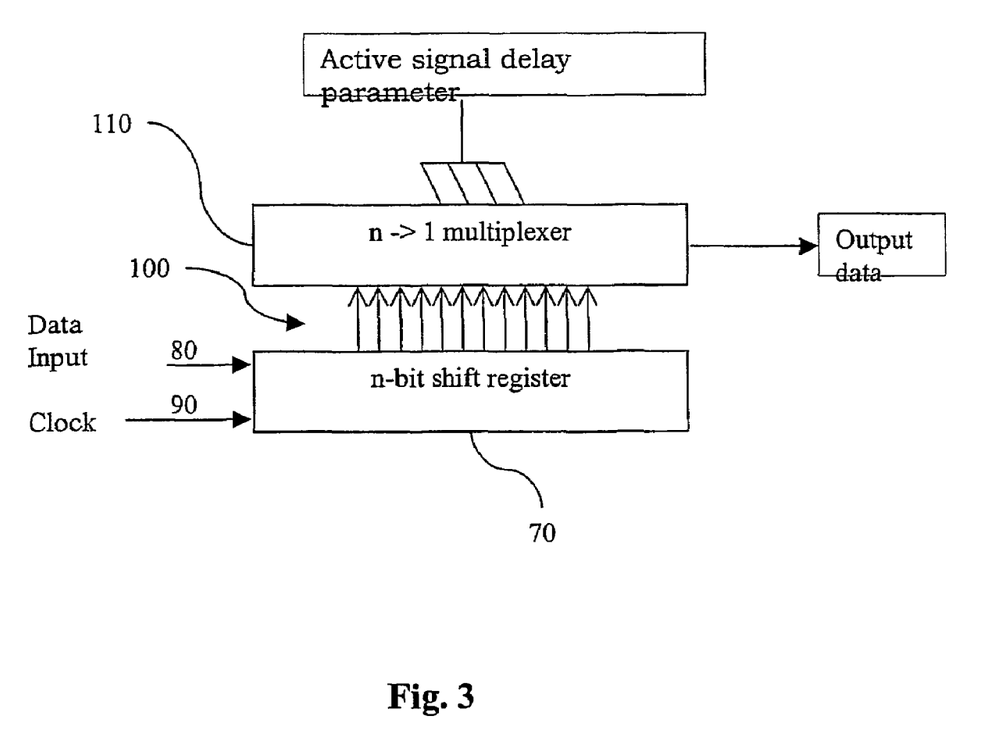
FIG. 3 shows a schematic view of an active delay unit in the form of a shift register.

The active delay unit may be in the form of a shift register or a commercially available delay circuit. FIG. 3 shows one exemplary embodiment of an active delay unit, in the form of a shift register. In this embodiment the input signal from the BS 30 is connected to a shift register 70 which length determines the delay range. The shift register has a serial input 80, a clock input 90 and a number of parallel outputs 100. For each clock pulse, the input data is shifted one step in the shift register 70. For each step in the shift register 70 the signal is delayed a predefined amount of time. The active signal delay parameter is set in a multiplexer 110, and it defines from which parallel output 100 the signal is be read and thereafter provided as an output from the multiplexer 110.

Example: If the wanted signal delay is 200 ns and the delay in each step in the shift register 70 is 50 ns, the output is read after the fourth step in the shift register 70.

The system above is described using TRX (Transciever) devices. But the inventive idea can also be applied on a one-way communication system including Transmitter (TX) devices instead of TRX devices.

The communication between BS 30 and the TRX 20 may further not be limited to communication via distribution lines in the form of cables, said communication could be wireless e.g. by radio or IR waves.

To achieve reliable communication between the BS 30 and the TRX 20 a system for error detection is proposed. The distribution line between a BS and a TRX (in general; between to units) may in some cases be a Front End LAN (FEL) cable, which is a cable that use balanced pairs for signal transmission. A balanced pair is a pair A and B of conductors that always have opposite level. A>B is interpreted as a logical one and A<B is interpreted as a logical zero. There is one pair A/B for transmit and one pair A/B for receive between the units.

To detect errors in the FEL cable the remote driver forces A>B in idle state. A local line termination in the receiver end forces A<B. The line termination is weaker than the driver. Then, if cables A and B are connected, A>B is measured at the receiver end indicating a proper cable. If cable A and/or B is broken A<B or A=B will be measured at the receiver end indicating a cable error.

At the transmitter end a remote strong termination forces A>B. A local weak termination forces A<B. The local driver is switched off. Then, if cables A and B are connected, A>B is measured at the transmitter end indicating a proper cable. If cable A and/or B is broken A<B or A=B will be measured at the transmitter end indicating a cable error.

The measurement of cable status can be done at initialisation of the unit or on a regular basis.

Figure 4A:
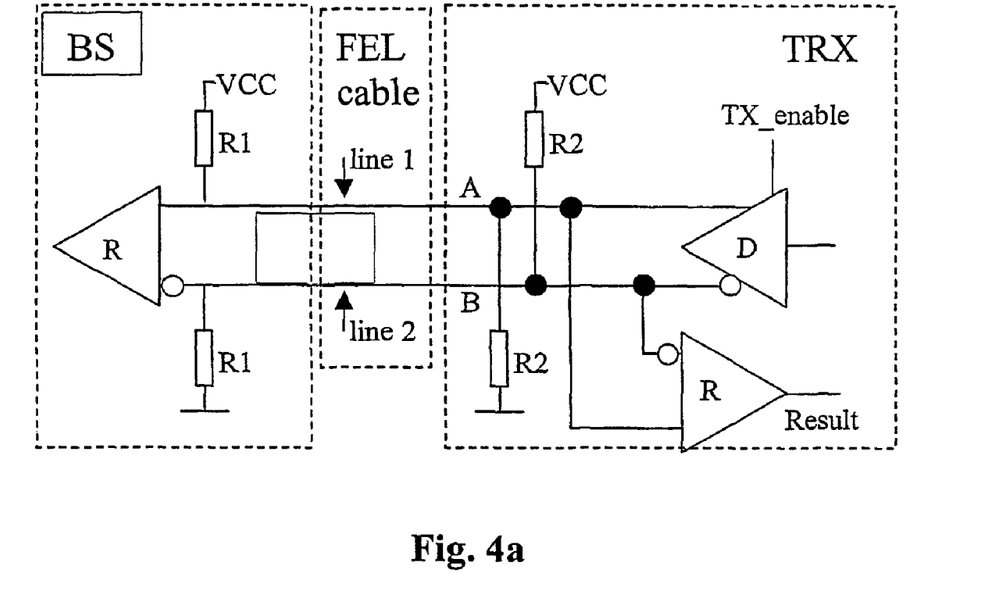
FIGS. 4a and 4b show another aspect of the invention.

FIG. 4a shows one embodiment of the transmitter end of the error detection system of the invention, wherein the resistor R1 is smaller than R2 (for example R1=1k, R2=10k) and hence the pullup/pulldown in the TRX (Transceiver) is weaker than the pullup/pulldown in the BS (Base station). When a line is at potential VCC it is regarded to have digital value 1, if line is grounded it have digital value 0.

If "TX enable" signal in the TRX is off, then the RX part in the TRX can listen at the lines 1 and 2 and measure digital values A and B.

A logical signal "result" is defined by below described possible values this signal can be used to see that the FEL cable is working properly.
- If the FEL cable connecting the TRX to the BS is completely functional A=1, B=0, i.e. A>B and this measurement will give a result of OK (FEL cable OK).
- If the line 1 is broken in the FEL cable A=0, B=0, i.e. A=B and the result will be NOT OK (FEL cable faulty).
- If the line 2 is broken in the FEL cable A=1, B=1, i.e. A=B and the result will be NOT OK (FEL cable faulty).

If both the lines is broken in the FEL cable A=0, B=1, i.e. A<B and the result will be NOT OK (FEL cable faulty).

Figure 4B:
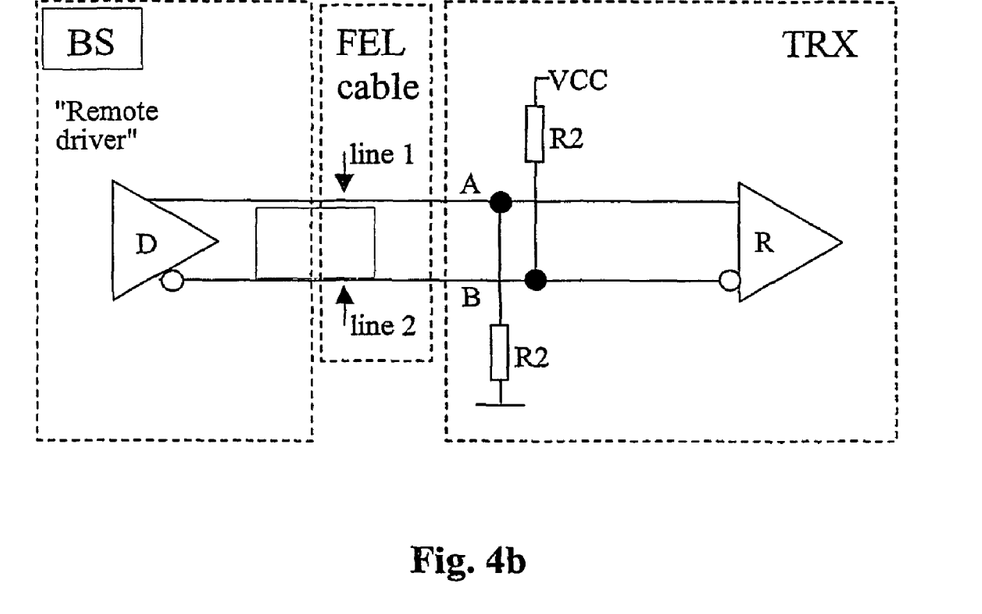

FIG. 4b shows one embodiment of the receiver end of the error detection system of the invention. The Remote driver is stronger than the local termination (R2 resistors) and in idle state the local driver forces A>B.

If the line 1 and line 2 are without failure the local receiver will register A>B.

If line 1 is broken it will register A=B

If line 2 is broken it will register A=B

If both lines 1 and 2 are broken it will register A<B

The error detection system of the invention may further be summarized as a cable malfunction detection system, said cable comprising a balanced pair (A, B) of conductors for signal transmission between a base station (BS) and a peripheral unit (TRX), the system comprising a first driver unit at one end of said cable for forcing one line (A) to a HIGH level, and the other line (B) to a LOW level, such that A>B;

a second driver unit at the other end of said cable capable of setting B>A, but being weaker than the first driver unit, such that the first driver unit, if operative, always takes precedence over the second driver unit;

means for measuring the actual levels of A and B in the peripheral unit; and means for comparing A and B, and output means for presenting the result of the comparison.

The cable malfunction detection system may further comprise means for issuing a malfunction message if the relation A>B does not hold.

Due to improvements in the system, hardware in the TRX may change with time. Under some circumstances such as at hardware changes it can be of interest to download the same software to all TRX regardless of the version of the hardware.

To get downloaded software to operate properly on different versions of hardware a hardware version identifier is programmed into non-volatile memory of the hardware unit during production process. When the software is downloaded it checks the hardware version identifier and modifies its operation to match the hardware version.

Such a system for enabling software operation modification according to hardware version, may be summarized as to comprise a non-volatile memory unit within said hardware, the contents of which is readable by the new software, and in which hardware version identification information is stored.

A method for enabling software operation modification according to hardware version, by new software installed on said hardware, may be summarized as to comprise the steps of storing hardware version identification information in a non-volatile memory in the hardware in question; and reading said information by said new software when new software is installed and modifying the operation of new software in accordance with the information read During the production process of a hardware unit a number of production tests are done to verify unit operation. It can be of interest to log that these different test steps are performed and optionally also log details about the different tests.

This may be accomplished during the production process, in that a production log is written into non-volatile memory of the hardware unit, at the end of each test step. Later on this memory can be read to obtain a test history of the unit.

Figure 5:
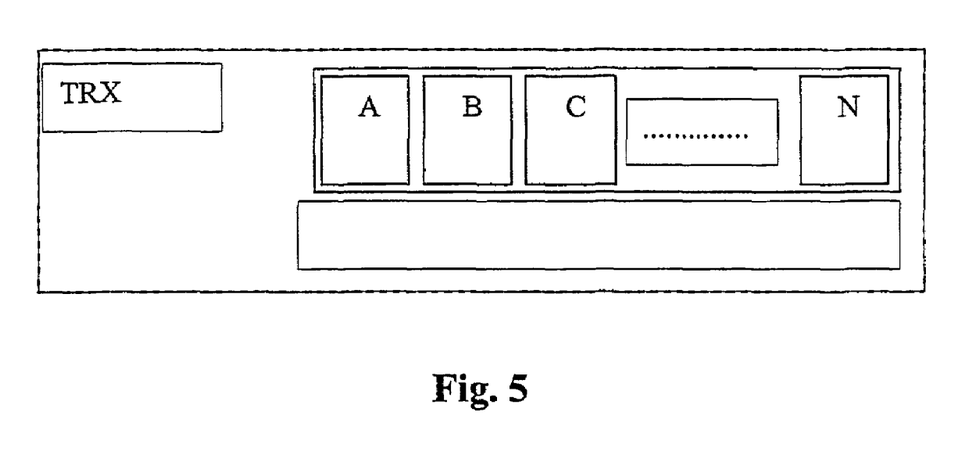
FIG. 5 shows another aspect of the invention.

The memory circuit required for this function is of standard type and is schematically shown in FIG. 5 wherein:

Results of first production test [Test A] is stored in subpart A

Results of second production test [Test B] is stored in subpart B

Results of third production test [Test C] is stored in subpart C

Results of final production test [Test N] is stored in subpart N

This method of hardware test logging, may be summarized as to comprise the steps of performing at least one test of said hardware during production;

storing information relating to said test(s) in a non-volatile memory in said hardware.

Such a device may be summarized as to comprise a non-volatile memory, having a number of partitions, each containing information relating to a different production test that said device was subjected to during production thereof.

IR transmitters are based on one or several IR diodes. The IR diodes can be connected in series in one or several chains. When current flows through a diode or chain of diodes IR light is emitted. One type of error that may occur in the transmitter is that a diode or chain of diodes is broken so no current can flow. To be able to detect such a malfunction a control circuit may be connected to each diode or chain of diodes. The control circuit gives one logical output when current flows and another logical output when no current flows. If the output is read when the IR transmitter is active, the circuit indicates if a diode or chain of diodes is broken or not.

Figure 6:
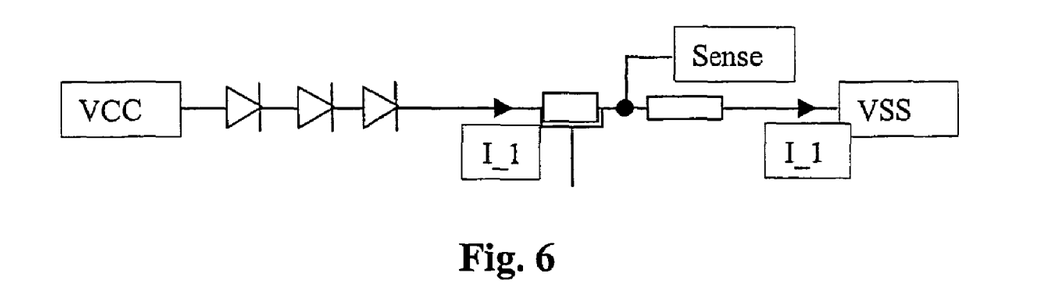
FIG. 6 shows another aspect of the invention.

One example of how to implement this function for a three-diode chain is shown in FIG. 6. When I_1 is zero the potential on Sense is zero, if the current I_1 is larger than zero the potential on Sense is also larger than zero, by measuring potential on sense signal one can determine if a current is larger than zero. In fact one also could set a voltage limit for Sense to determine that a predefined amount of current is flowing in this diode/diode chain.

Such a system for detecting a broken IR LED chain comprising one IR diode or several IR diodes coupled in series, may be summarized as to comprise a current detect circuit coupled to each IR LED chain, said detect circuit giving a first logical output (1) if current flows in the chain, and a second logical output (0) if no current flows. In an alternative embodiment the first logical output (1) is given only if the current exceeds a predetermined level.

Some IR transmitters use several IR diodes and high diode currents to generate the required optical output. These currents will generate electromagnetic fields and cause Electro Magnetic Interference (EMI) that may disturb other equipment and violate emission standards. Therefore it is of interest to keep this electromagnetic interference low.

To reduce the electromagnetic interference the printed circuit board (PCB), where the IR diodes are mounted, is designed with a trace pattern reducing the emission. Tracing is done according to FIG. 7 (with a four diode chain as an example) and all traces are done in the same PCB layer. As an alternative approach the path could be done using several PCB layers.

Figure 7:
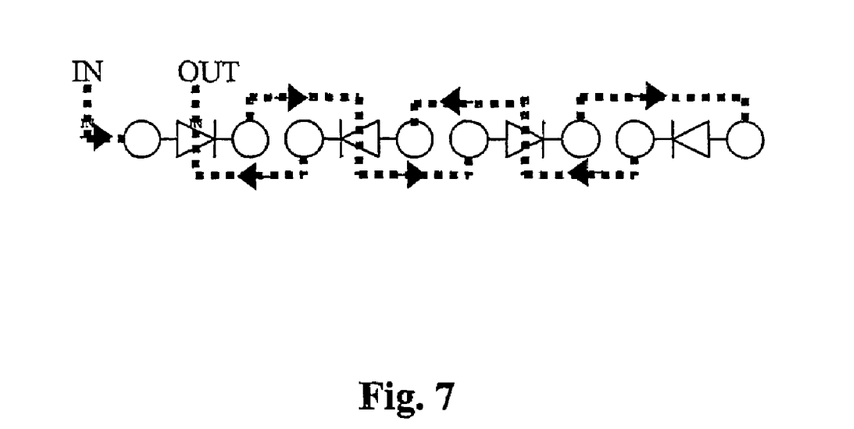
FIG. 7 shows another aspect of the invention.

The intention of this invention is to see to that the PCB layout is made in such a manner that the Magnetic and Electric field emitted from the diode chain is minimised. Two currents in different directions will minimise the fields, and by also change position (above the diode or below the diode in the figure) of the two current directions one gets a wire "twisted in two dimensions" and that will further decrease the Electro-magnetic interference (EMI).

Such a conductor structure on a printed circuit board for minimizing disturbing electromagnetic fields generated by said conductors, may be summarized in that said conductors are arranged such that there is always at least a segment of a conductor running in an opposite direction to an adjacent conductor, whereby the electromagnetic fields generated by each said conductor, in operation, substantially cancel each other. The conductor segments may further be arranged in a layer on said circuit board, or optionally in different layers of the circuit board. The conductor structure may still further connect Infra Red Light Emitting Diodes in a chain. The diodes may be arranged in an array, pair-wise in a head-to-head arrangement, such that the current direction through the diodes are opposite each other in each pair. The outgoing conductor from one diode may be laid out on the circuit board so as to pass beneath the other diode of said pair.

IR diodes are sensitive to long-lasting high current. At operation the current may be high but the operation is pulsed in a way not degenerating the diodes. Operation is controlled by a micro controller. During power up of an IR transmitter there is a start up time of the micro controller (and optionally other integrated circuits) during which the outputs are uncontrolled; outputs are in high impedance state. Hence, there is a risk for high current during long time at power up.

Therefore a passive, weak, deactivation circuit (for example a pullup or pulldown resistor) is proposed to be connected between the controller and the IR driver. During power up the deactivation circuit will ensure that the IR driver is switched off. When the controller become operational, the outputs will take their appropriate values and since the outputs are stronger than the deactivation circuit the controller can control the IR driver.

Such an arrangement for disabling a high current sensitive device (IR LED) in a system comprising components requiring a finite time during power up before being operative may be summarized in that, said device (IR LED) being powered by a driver unit, and the operation of said system being controlled by a micro controller, said arrangement comprising a passive and weak deactivation circuit coupled between the controller and the driver unit, whereby the outputs of said controller at full power are stronger than said weak deactivation circuit, and thereby takes precedence over the deactivation circuit. Said high current sensitive device may be an infrared light emitting diode device (IR LED).

Such a method for disabling a high current sensitive device (IR LED) in a system comprising components requiring a finite time during power up before being operative, said device (IR LED) being powered by a driver unit, and the operation of said system being controlled by a micro controller, the method may be summarized by comprising the steps of providing a control by a weak deactivation circuit such that no current is passed through said device (IR LED) during power up;

providing outputs from said controller at full power that take precedence over said control by said weak deactivation circuit, to render said device operative.

To detect I/Q offsets for unbalanced hardware a quadrature detector is proposed. The quadrature detector is effective for detecting a signal of known frequency but unknown phase.

The signal to be detected is split into two parts; 0.degree. part and 180.degree. part. (Part 180.degree. is the inverse of part 0.degree.) The detector generates four clocks of same frequency as the signal but all four clocks are separated 90.degree. The clocks are called C0, C90, C180 and C270. The detector has two integrators. The first integrator I integrates the sum of signal part 0.degree. sampled with C0 and signal part 180.degree. sampled with C180. The second integrator Q integrates the sum of signal part 0.degree. sampled with C90 and signal part 180.degree. sampled with C270. By this method the contents of the integrators can be viewed as an I/Q diagram where I integrator represents the I vector and Q integrator represents the Q vector. The vectors will always be perpendicular. The resultant vector of I- and Q-vectors represent the signal. The length of the resultant is the signal strength and the angle of the resultant is the phase of the signal with reference to the detector clocks.

Before a signal is to be detected the integrators are reset. Each integrator output is connected to input of a sample and hold circuit. During signal sampling the sample and hold circuits are set in sample mode. At end of signal sampling the sample and hold circuits are set in hold mode and the I- and Q vectors can be read out and the resultant vector calculated. The detector clocks can be switched off when no signal is expected to reduce system noise and current consumption.

Due to non-linearity in the detector circuits the origin of the I/Q diagram may not be centered. By taking multiple noise samples as described above the effective centre of the I/Q diagram can be calculated as an I/Q offset and this offset can be used in later calculations of the resultant vector for a signal sampled to compensate for any non-linearity.

Figure 8A:
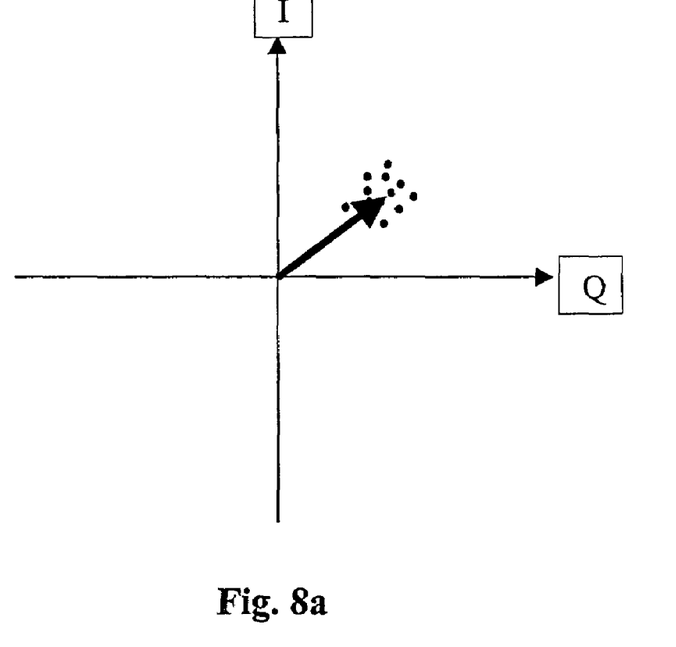
FIGS. 8a and 8b show another aspect of the invention.
Figure 8B:
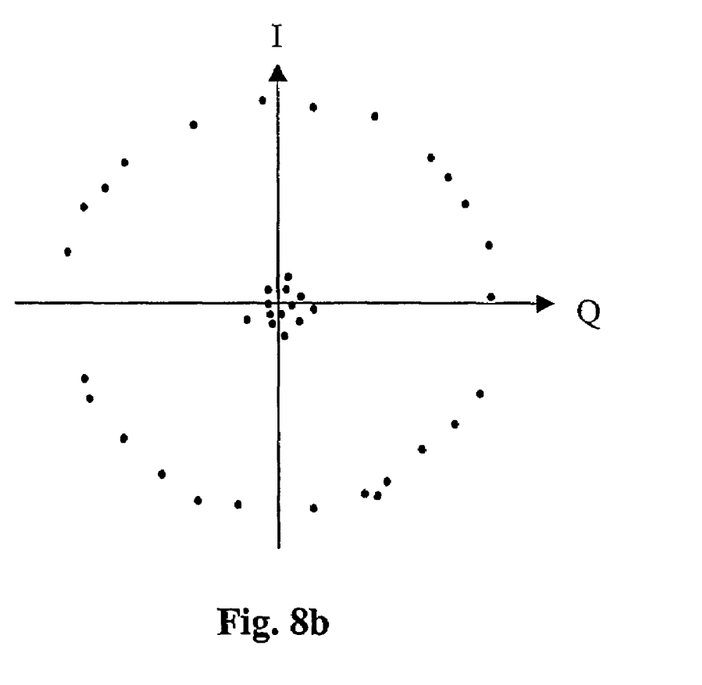

The I and Q values can be expressed as imaginary and real part of a complex number (Mathematics) and to illustrate I and Q one can draw two perpendicular axes I and Q like in FIG. 8a. In the I/Q diagram of FIG. 8a the noise have been sampled and the I and Q values result is according to the figure not centered around the origin, but when the vector I/Q offset is subtracted from all the values result shown in FIG. 8b is achieved, and the received signal is also written in this graph, now centered around the origin:

Such a method of compensating for non-linearity in a quadrature detector, may therefore comprise the steps of:

taking a plurality of noise samples represented as I/Q vectors, and calculating an average I/Q vector representing an offset from origin in said I/Q diagram; and using said average offset I/Q vector for compensating subsequent sampled signals to obtain a corrected I/Q diagram.

Product marking on chassis is an easy way to identify type of unit. At service, one or several units may be disassembled. When reassembling again, there is a risk that the part with the unit identifier is mounted on the wrong unit. Description: Product marking is placed on a part of the unit that not is subject for removal at service. Hence, there is no risk that part with unit identifier is mounted on wrong unit.

In ESL systems there are receivers for reception of wireless data from ESLs to Master Computer (MC; an item controlling the ESL system). Data sent to the ESL or other data can be acknowledged if there is noise interfering with the data transmission in the environment. To prevent the noise to disturb the receiver a threshold can be defined. All signals of strength below this threshold are ignored and all signals of strength above this threshold are interpret as valid signals.

To achieve this a calibration mechanism is used to find an appropriate threshold level. The threshold is based on a calibration result and a threshold multiplier. The calibration result is obtained by the receiver sampling the noise a number of times (the number is configurable with 400 samples as default) and then calculating the mean value of the strongest fraction of the noise samples.

This mean value is the calibration result. The calibration result is then multiplied with an adjustable value called threshold multiplier. By changing threshold multiplier, the Signal to Noise Ratio (SNR) can be changed. SNR gives the probability for not detecting a valid signal and the probability to interpret noise as signal. The threshold multiplier is set once to get required SNR and calibration is done on a regular basis based on a configurable time-out to handle the fact that environment noise may vary over time. If the time-out has expired when the receiver is expected to receive data, a re-calibration is done. If noise now has changed compared to previous calibration the threshold will be changed preserving the selected SNR.

Figure 9A:
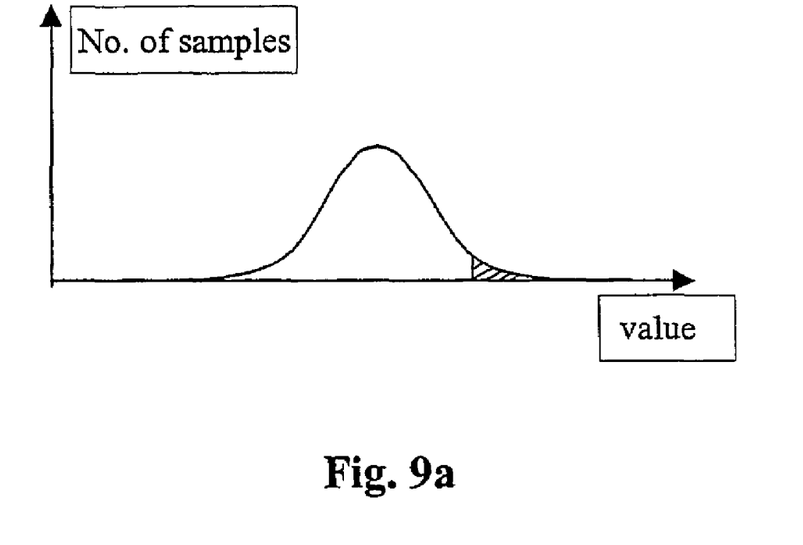
FIGS. 9a and 9b show another aspect of the invention.

The strongest fraction can be described by using a histogram like in FIG. 9a showing a statistical distribution (not the actual statistical distribution but an example of a statistic distribution). The calibration result is the mean value of the strongest fraction.

Figure 9B:
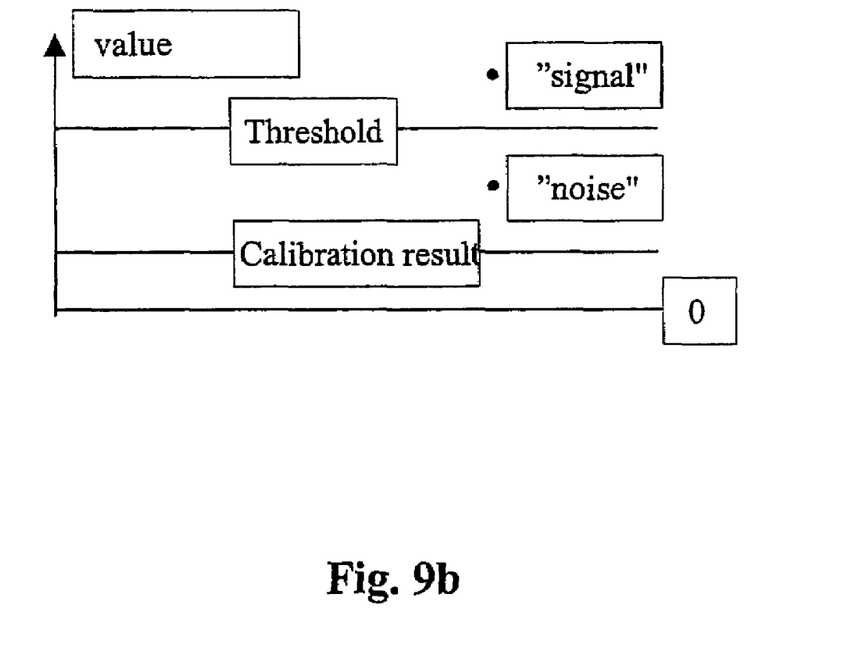

The threshold defines part of the received signal regarded as noise and the part regarded as signal. The threshold is defined as the calibration result multiplied by the wanted S/N ratio (S/N ratio is also called Threshold multiplier in this text), as shown in FIG. 9b.

Such a method of setting a threshold for accepting a received signal as a valid signal in a transceiver system exposed to varying environmental noise levels, may comprise the steps of:

sampling noise data a selected number of times;
calculating a mean value of a fraction of sampled noise data representing the strongest noise signals;
multiplying said mean value with a selectable and adjustable threshold multiplier representing a desired S/N ratio to obtain a desired threshold;
storing said threshold in the transceiver system.

The noise level could further be monitored during operation, and if said noise level is changed, the threshold setting procedure is repeated, so as to change the threshold in order to maintain the desired S/N ratio. The method could further comprise the step of waiting a predetermined maximum time during which no valid signal is detected before repeating the threshold setting procedure.

For many reasons it is of interest to assign a unique identity the each hardware unit. The identity may be used for tracking or addressing purposes.

This may be achieved by assigning, during the production process, each unit a unique identity stored in a non-volatile memory. This identity may be printed on a tag attached to the unit. During operation this identifier can be used for logical addressing of the unit. The identifier can also be used to assign a separate logical address to the unit. This logical address can hold information of the environment of the unit in the installation. I.e. this logical address can be changed from a user interface in the working environment long time after the production of the unit.

The invention claimed is:

1. A method for creating synchronized transmission of messages in a wireless electronic shelf labeling system comprising at least two transmitters, a plurality of receiving label-units and a central processing unit capable of issuing messages to be transmitted via said transmitters, the method comprising determining, for each transmitter, the signal delay between issuing of a message at the central processing unit and transmission of the message from the transmitter; actively delaying, in response to said determined signal delay, transmission from the individual transmitters such that synchronized transmission from all transmitters is achieved, wherein the step of determining the signal delay comprises setting the transmitters in a mirror-mode so that they automatically mirror all received pulses back to the central processing unit and measuring the time-difference between sending and receiving the same pulse.

2. The method according to claim 1 wherein the active delay of the transmission from the transmitters is performed by an active signal delay unit associated with each transmitter.

3. The method according to claim 2 wherein the step of determining the signal delay comprises setting the transmitters in a mirror-mode so that they automatically mirror all received pulses back to the central processing unit and measuring the time-difference between sending and receiving the same pulse.

4. The method according to any of the claims 1, 2, and 3 wherein the active delay for each transmitter is set to the difference between the delay to that particular transmitter and a predefined maximum delay value.

5. The method according to any of the claims 1, 2, and 3 wherein the active delay for each transmitter is set to the difference between the delay to that particular transmitter and the highest determined signal delay to any transmitter in the system.

6. A transmitter for a wireless electronic shelf labeling system, wherein the transmitter comprises an active signal delay unit that is arranged to delay transmission from said transmitter, and is adjustable in correspondence with an active signal delay parameter, wherein the transmitter is arranged to be set in a mirror-mode so that it automatically mirrors all received pulses back for measuring the time-difference between sending and receiving the same pulse.

7. The transmitter for a wireless electronic shelf labeling system according to claim 6 wherein the active signal delay unit comprises a shift-register.

8. A wireless electronic shelf labeling system comprising at least two transmitters, a plurality of receiving label-units and a central processing unit capable of issuing messages to be transmitted via said transmitters, wherein the system comprises one or more active signal delay units that are arranged to delay transmission from said transmitters, and adjustable in correspondence with an active signal delay parameter, wherein the at least two transmitters are arranged to be set in a mirror-mode so that they automatically mirror all received pulses back for measuring the time-difference between sending and receiving the same pulse.

9. The wireless electronic shelf labeling system according to claim 8, wherein each active signal delay unit is arranged in a transmitter and arranged to delay transmission from said transmitter.

10. The wireless electronic shelf labeling system according to claim 8, wherein the active signal delay units are arranged at the central processing unit and arranged to delay issuing of messages to their associated transmitters.

11. The wireless electronic shelf labeling system according to any of the claims 8 to 10, wherein the transmitters communicate with the central processing unit by means of distribution lines in the form of cables.

12. The wireless electronic shelf labeling system according to any of the claims 8 to 10, wherein the transmitters communicate with the central processing unit by means of wireless connections.

13. A method for creating synchronized transmission of messages in a wireless electronic shelf labeling system comprising at least two transmitters, a plurality of receiving label-units and a central processing unit capable of issuing messages to be transmitted via said transmitters, the method comprising determining, for each transmitter, the signal delay between issuing of a message at the central processing unit and transmission of the message from the transmitter; actively delaying, in response to said determined signal delay, transmission from the individual transmitters such that synchronized transmission from the at least two transmitters is achieved.

* * * * *